United States Patent
Yang et al.

(10) Patent No.: US 6,634,797 B2
(45) Date of Patent: Oct. 21, 2003

(54) MULTI-FIBER ARRAY ASSEMBLY

(75) Inventors: Sunney Yang, Hershey, PA (US); Tien Lu Kao, La Mirada, CA (US); Frank Quach, Cypress, CA (US); Jim Xin Zhao, Mission Viejo, CA (US); Chiu Yu Tang, Lake Forest, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/033,686

(22) Filed: Dec. 27, 2001

(65) Prior Publication Data

US 2003/0123810 A1 Jul. 3, 2003

(51) Int. Cl.$^7$ ................................................ G02B 6/38
(52) U.S. Cl. .................... 385/59; 385/60; 385/63; 385/65; 385/78; 385/79
(58) Field of Search ............................ 385/59, 60, 61, 385/63, 65, 78, 79, 83

(56) References Cited

U.S. PATENT DOCUMENTS

| | | | |
|---|---|---|---|
| 5,133,032 A | * 7/1992 | Salter et al. | 385/60 |
| 5,796,896 A | * 8/1998 | Lee | 385/59 |
| 6,116,788 A | * 9/2000 | Melchior et al. | 385/59 |
| 6,116,789 A | * 9/2000 | Mrakovich et al. | 385/59 |
| 6,146,023 A | * 11/2000 | Weigel | 385/55 |
| 6,219,479 B1 | * 4/2001 | Madden et al. | 385/46 |
| 6,527,452 B1 | * 3/2003 | Sejourne | 385/60 |
| 2002/0150348 A1 | * 10/2002 | Nguyen | 385/59 |

FOREIGN PATENT DOCUMENTS

JP          62111215 A  *  5/1987  ............ G02B/6/36

* cited by examiner

Primary Examiner—John D. Lee
Assistant Examiner—Daniel Valencia
(74) Attorney, Agent, or Firm—Wei Te Chung

(57) ABSTRACT

A multi-fiber array assembly comprises a main housing, a ferrule holder, a stopper, a front plate, a strain relief assembly, springs and ferrules with optical fibers retained therein. The ferrule holder is retained in the housing, and comprises a ferrule holding plate defining a first array of holes. The stopper is secured to the ferrule holder at a location rearward of the first array of holes, and defines a plurality of passages. The ferrules have a conical front ends, and are extended in the first array of holes. The springs are compressed between the ferrules and the stopper. The optical fibers extend through the passages of the stopper. The front plate is secured to a front end of the ferrule holder and defines a second array of the hole. Each hole of the second array has a rear conical section in which the conical front end of a corresponding ferrule is fitted.

14 Claims, 5 Drawing Sheets

MULTI-FIBER ARRAY ASSEMBLY

BACKGROUND OF THE INVENTION

1. Field of the Invention

The present invention relates to optical communications assemblies, and particularly to a multi-fiber array assembly.

2. Description of Prior Art

Fiberoptics has been the driving force in the current communication revolution which has enabled carriers to achieve enormous data throughput. In order to realize the full potential of fiber optics, the technology is being incorporated into all facets of integrated electronics. This makes it possible to fully utilize the enormous bandwidth of the optical fiber in conjunction with the high speeds of semiconductor integrated circuitry.

Therefore, arrays of optical fibers need to be coupled precisely and reliably to semiconductor laser and detector arrays on an integrated circuit chip. Already, various groups throughout the world have demonstrated the feasibility of high-speed optoelectronic VLSI switching and two dimensional fiberoptic arrays for an optical crossbar switch. Such devices are disclosed in, for example, High-Speed Optoelectronic VLSI Switching Chip With>4000 Optical I/O Based on Flip-Chip Bonding of MQW Modulators and Detectors to Silicon CMOS, Anthony L. Lentine et al., Vol. 2, No. 1, p. 77, April 1996, and Fabrication of Two-Dimensional Fiber Optic Arrays for an Optical Cross-Bar Swith, Geoff M. Proudley, Henry White, Optical Engineering, Vol. 33, No. 2, pp. 627–635, February 1994.

The above publications purport to achieve a fiber array positional accuracy (center-to-center spacing error) of approximately +/−5 micrometers. However, such accuracy cannot meet the need of present day optoelectronic devices such as charge couple devices (CCDs), photodetectors and lasers using semiconductor technology. A high precision fiber arrays with center-to-center spacing errors not exceeding +/−2 micrometers is needed to meet current requirement.

U.S. Pat. No. 5,907,650 disclosed a high precision fiber array assembly having center-to-center spacing error not exceeding +/−2 micrometers. Referring to FIG. 1, the array disclosed an optical fiber 1 comprising a central core 2, a cladding layer 3 and an outer jacket 4. One end of the fiber 1 is stripped to expose an end having a predetermined length. Thereafter, the exposed end is shaped to form a conical tip 6.

Referring also to FIG. 2, fiber receiving openings 7 are formed in a mask 8. This is preferably done by laser machining from a rear side (fiber insertion side) of the mask 8. The openings 7 are formed in a suitable predetermined pattern with predetermined spacing.

Referring also to FIG. 3, to assemble the array, the tip 6 of the fiber 1 is inserted into a corresponding receiving opening 7 from the rear side of the mask 8. A periphery of the tip 6 engages the mask 8 at a rearmost portion of the corresponding receiving opening 7. After all fibers 1 are completely inserted into the openings 7, bonding material 9 is applied to a front side of the mask 8. The bonding material 9 covers the tips 6 and fills the openings 7, and covers the front side of the mask 8. Thereafter, the tips 6 and bonding material 9 are ground and polished. This removes a portion of the bonding material 9, and removes portions of the tips 6 such that front faces of the cores 2 are exposed.

Because the fibers 1 are secured in the openings 7 of the mask 8 with the bonding material 9, assembly of the array is irreversible. If any fiber is found to be damaged or malfunctioning, it is almost impossible to repair or replace. The entire array must be discarded, and replaced with a new one. The cost of each array is relatively high. Thus, an improvement multi-fiber array overcomes the abovementioned problems is desired.

SUMMARY OF THE INVENTION

Accordingly, an object of the present invention is to provide a design which can be disassembled to replace and repair any damaged element Another object of the present invention is to provide a design which has a low assembly costs.

To achieve the above objects, a multi-fiber array assembly in accordance with the present invention comprises a main housing, a ferrule holder, a stopper, a front plate, a strain relief assembly, a plurality of springs and a plurality of ferrules with optical fibers retained therein. The ferrule holder is retained in the main housing, and comprises a ferrule holding plate defining a first array of holes therethrough. The stopper is secured to the ferrule holder at a location rearwardly of the first array of holes, and defines a plurality of passages therein. Each ferrule has a conical front end and is extended in a corresponding hole of the first array of holes. The springs are compressed between the ferrules and the stopper thereby exerting a forward pushing force to the ferrules. The optical fibers extend through the passages of the stopper. The front plate is secured to a front end of the ferrule holder and defines a second array of the holes therein. Each holes of the second array has a rear conical section in which the conical front end of a corresponding ferrule is fitted. The strain relief assembly is secured to a rear end of the main housing, and a water-proof rubber block is mounted between the main housing and the strain relief assembly to provide a watertight seal therebetween. The waterproof rubber block defines a third array of holes corresponding to the first and second arrays of holes. The optical fibers extend through the third array of holes, respectively, and are held in the water-proof rubber block so as to be watertight.

DETAILED DESCRIPTION OF PREFERRED EMBODIMENT

Figure 1:
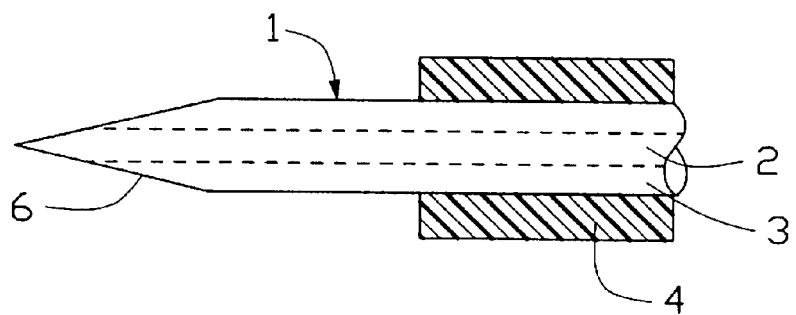
FIG. 1 is a cross-sectional view of a stripped conventional optical fiber.
Figure 2:
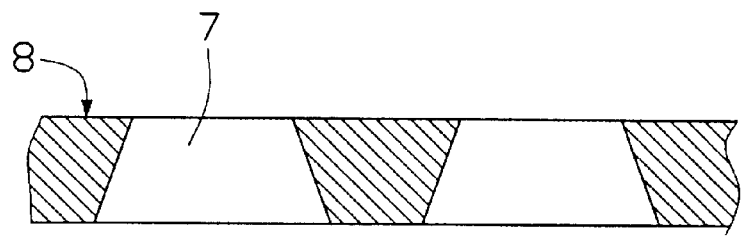
FIG. 2 is a cross-sectional view of part of a conventional fiber mask.
Figure 3:
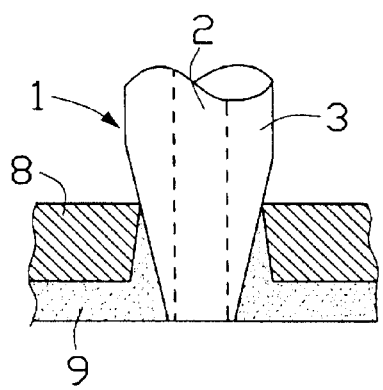
FIG. 3 is an assembled cross-sectional view of part of the fiber of FIG. 1 and part of the mask of FIG. 2.
Figure 4:
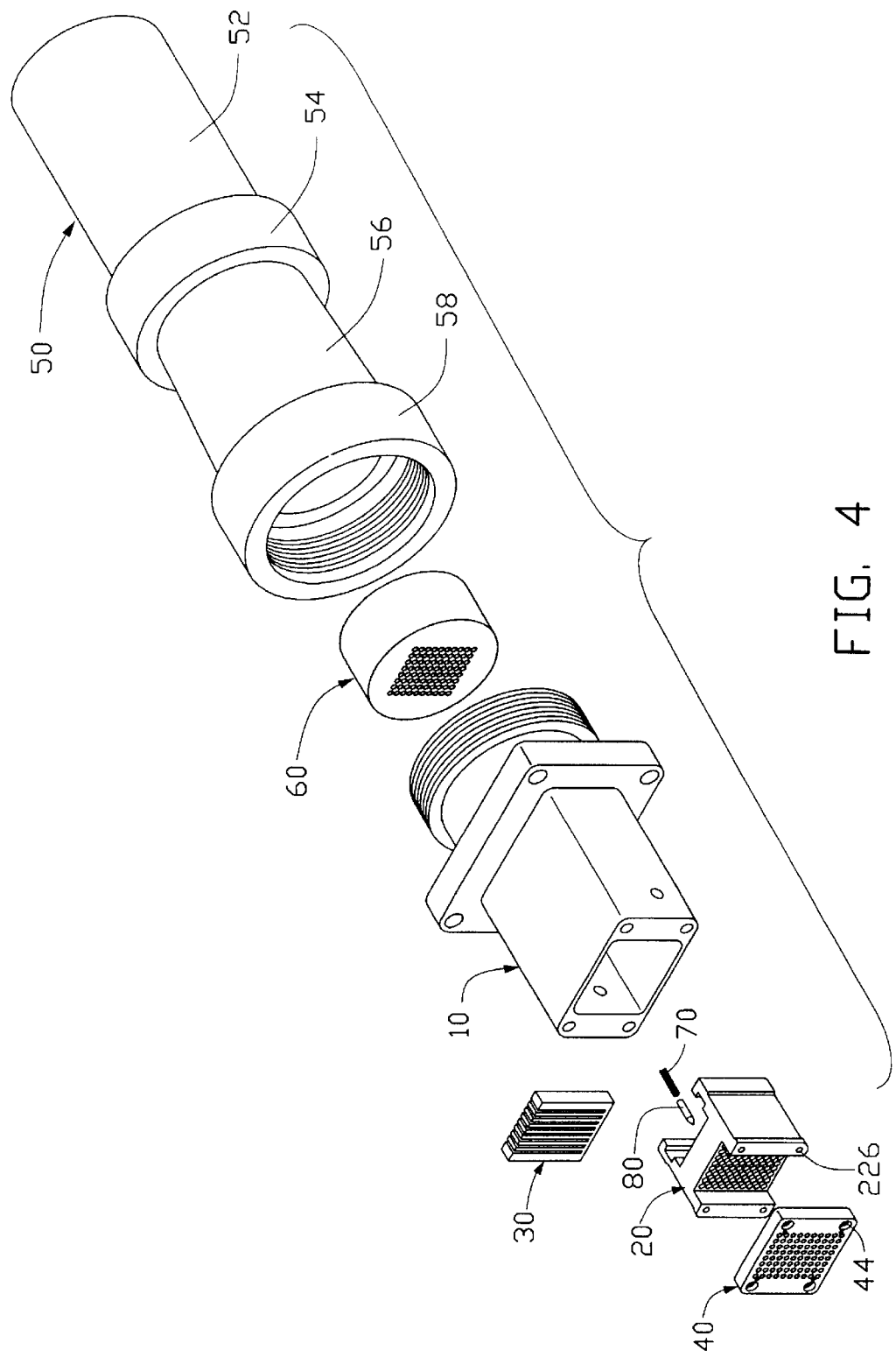
FIG. 4 is an exploded view of a multi-fiber array assembly in accordance with the present invention, but only showing one ferrule and one spring thereof, and not showing optical fibers thereof.
Figure 5:
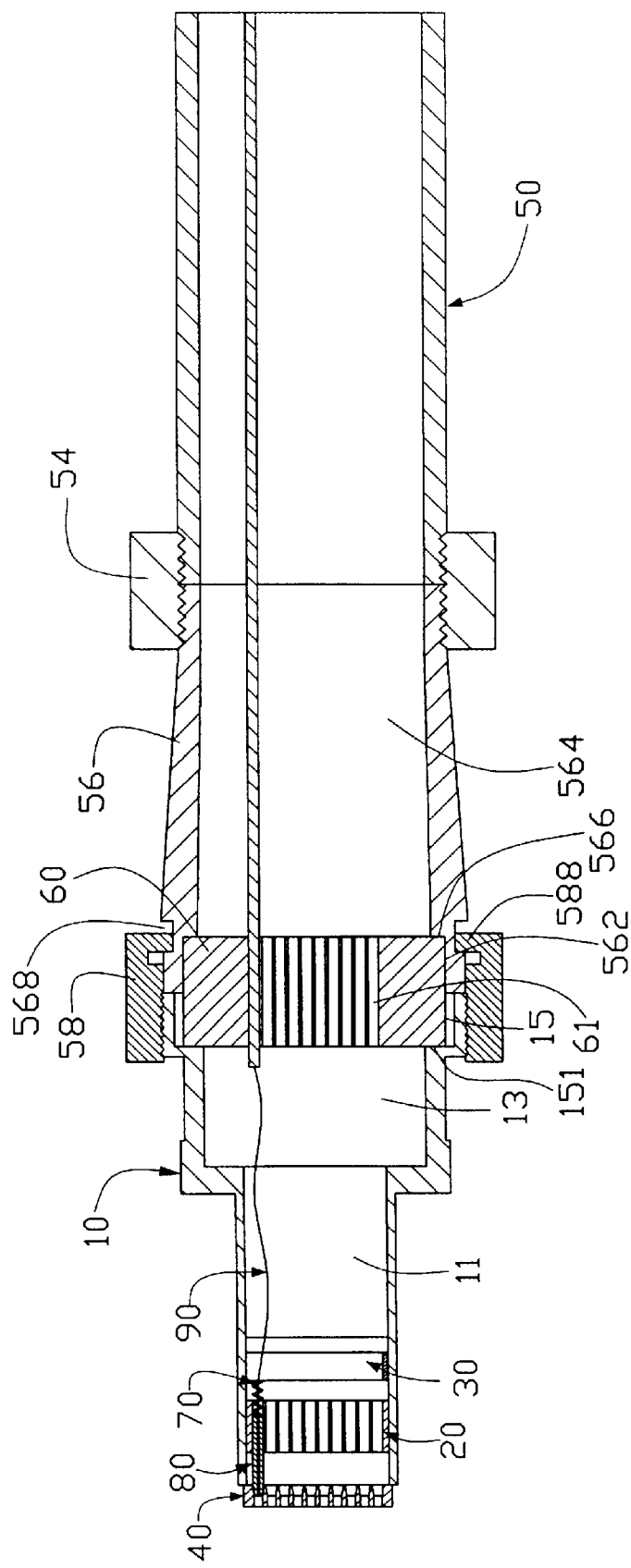
FIG. 5 is a cross-sectional view of the multi-fiber array assembly in accordance with the present invention, but only showing one ferrule and one spring thereof.

Referring to FIGS. 4 and 5, a multi-fiber array assembly in accordance with the present invention comprises a metallic housing 10, a ferrule holder 20, a stopper 30, a front plate 40, a strain relief assembly 50, a water-proof rubber block 60, a plurality of compression springs 70 and a plurality of ferrules 80 with optical fibers 90 retained therein.

Figure 6:
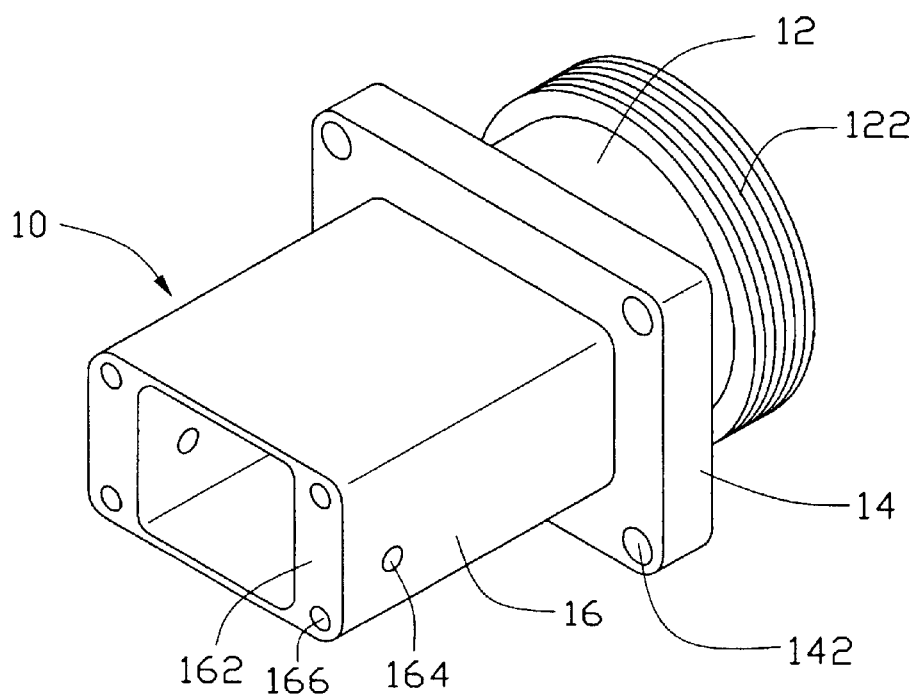
FIG. 6 is a perspective view of a housing of the multi-fiber array assembly in accordance with the present invention.

As best shown in FIG. 6, the metallic housing 10 comprises a tubular body having a rear round section 12, a front rectangular section 16 and a rectangle flange 14 between the two sections 12, 16. The rear round section 12 forms an external thread 122 at a rear end thereof Four apertures 142 are respectively defined in four corners of the rear round section 12, for mounting the multi-fiber array assembly to a complementary apparatus (not shown). The rectangle section 16 comprises four sides and an end face 162. Two holes 164 are respectively defined in two opposite lateral sides, for extension of two screws (not shown) to secure the ferrule holder 20 in the metallic housing 10, Four threaded apertures 166 are respectively defined in the end face 162 for accommodating recessed screws.

Referring to FIG. 5, three communicated chambers are defined in the metallic housing 10. A first rectangle chamber 11 is defined in the rectangle section 16. A second round chamber 13 is defined in the round section 12. A third round chamber 15 is also defined in the round section 12, rearward of the second chamber 13 and a vicinity of the thread 122. The third chamber 15 is larger than the second chamber 13, thereby forming a first shoulder 151 therebetween. The third chamber 15 is used to receive the water-proof rubber block 60, such that the first shoulder 151 engages with the water-proof rubber block 60 to provide a watertight seal.

Figure 7:
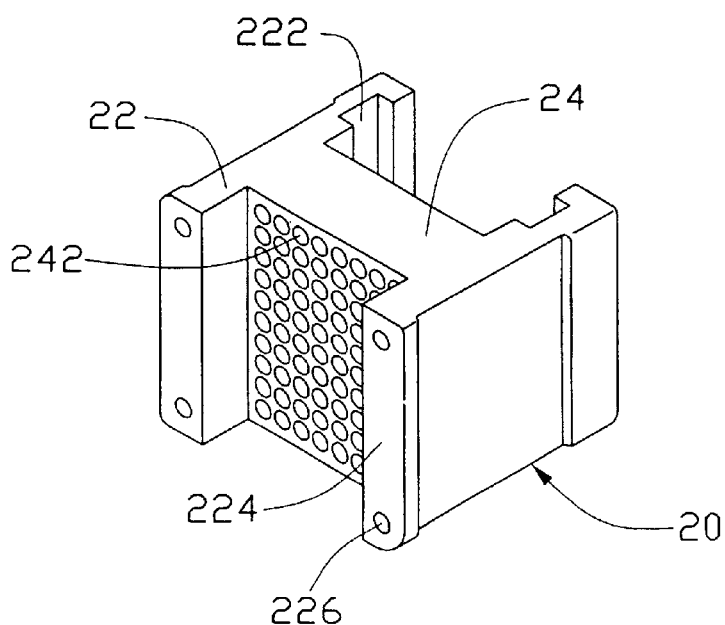
FIG. 7 is a perspective view of a ferrule holder of the multi-fiber array assembly in accordance with the present invention.

Now referring to FIG. 7, the ferrule holder 20 has a generally "H" shaped profile. The ferrule holder 20 comprises two parallel plates 22, and a ferrule holding plate 24 perpendicularly connection between the plates 22. The plate 24 defines a first array of holes 242 therethrough. Two vertical grooves 222 are respectively defined in inner faces of rear portions of the side plates 22, for retainingly receiving the stopper 30. Each side plate 22 has a front end face 224. Two spaced apertures 226 are defined in each end face 224.

Figure 8:
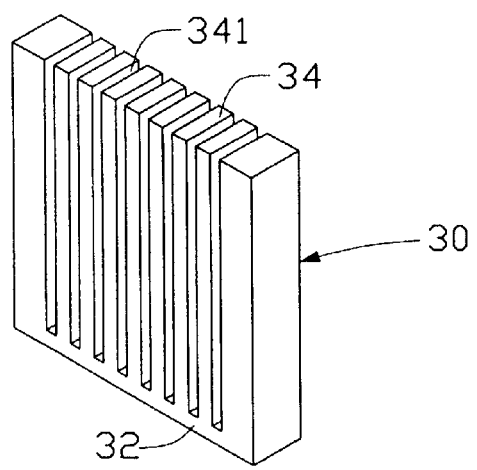
FIG. 8 is a perspective view of a stopper of the multi-fiber array assembly in accordance with the present invention.

Referring to FIG. 8, the stopper 30 comprises a base 32 and nine teeth 34 extending vertically upwardly from the base 32. Eight passages 341 are thereby interleavingly defined between the teeth 34. The passages 341 are for equidistantly accommodating eight columns of optical fibers 90 extended therethrough. Each such column includes ten optical fibers 90.

Figure 9:
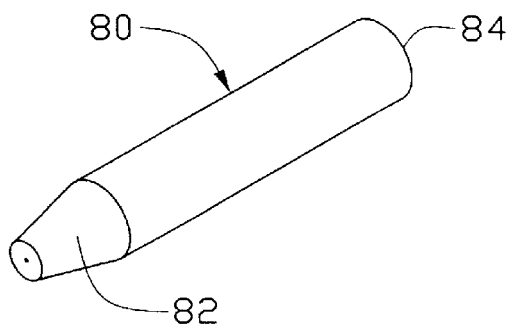
FIG. 9 is a perspective view of one ferrule of the multi-fiber array assembly in accordance with the present invention.
Figure 10:
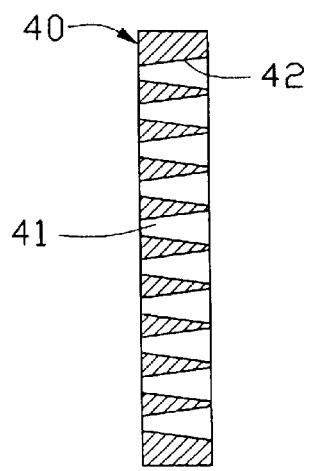
FIG. 10 is a cross-sectional view of a front plate of the multi-fiber array assembly in accordance with the present invention.

Referring to FIG. 9, each ferrule 80 has a configuration like a round rod, and comprises a conical end 82 and a bottom 84. The ferrules 80 are respectively retained in the holes 242 of the ferrule holder 20. Referring to FIGS. 4 and 10, the front plate 40 defines a second array of holes 41 corresponding to the first array of holes 242 of the ferrule holder 20. Each hole 41 has a conical section 42 for fittingly receiving the conical end 82 of the ferrule 80. Four holes 44 are respectively defined in four corners of the front plate 40, corresponding to the apertures 226 of the ferrule holder 20. The conical ends 82 of the ferrules 80 are extended through the first array of holes 242 of the holder 20 to fit in the conical sections 42 of the second array of holes 41 of the front plate 40, respectively. The springs 70 exert pushing force on the bottoms 84 of the ferrules 80, respectively. Such pushing force causes the front conical ends 82 of the ferrules 80 to tightly engage with the front plate 40. When the conical end 82 of each ferrule 80 is pushed into the conical section 42 of a corresponding hole 41 of the front plate 40, a slope of the holes 41 of the front plate 40 matches a slope of the conical section 42. Accordingly, the ferrule 80 self-aligns and eventually stops at a point that depends on tolerances of the ferrule 80 and the hole 41. Regardless of the point at which the ferrule 80 stops, the ferrule 80 is accurately engaged in the hole 41 such that the X-Y axis tolerance of the ferrule 80 is virtually zero. Thus +/−2 $\mu$m tolerance of the ferrules 80 in the X-Y axis can be attained in practice. Furthermore, because all the ferrules 80 are subjected to the pushing force exerted by the spring 70, the conical tips 82 of the ferules 80 protrude from the front plate 40. Thus ends 82 of the ferrules 80 can gently abut a corresponding surface of the complementary apparatus (not shown). True zero tolerance, that is, true coplanarity, of the optical fibers 90 can thus be obtained.

Referring to FIGS. 4 and 5, the strain relief assembly 50 comprises a strain relief boot 52, a hand turning locking ring 54, a strain relief housing 56 and a lock ring 58. The hand turning lock ring 54 screws the strain relief boot 52 and the strain relief housing 56 together. An annular recess 568 is defined in a front end of an outer periphery of the strain relief housing 56. The lock ring 58 comprises an inner thread (not labeled) and an inner projection 588 located rearward of the inner thread. The projection 588 engages in the recess 568, and the inner thread engages with an outer tread (not labeled) of the metallic housing 10, such that the metallic housing 10 and the strain relief assembly 50 are locked together via the lock ring 58. The strain relief housing 56 defines communicating chambers therein, namely, fourth chamber 562 and a fifth chambers 564. The fourth chamber 562 is larger than the fifth chamber 564, and is located close to the front end of the strain relief housing 56. A second shoulder 566 is thereby formed in the strain relief housing 56. The water-proof rubber block 60 defines a third array of holes 61 corresponding to the first array of holes 242 and second array of holes 41. The holes 61 are for receiving the optical fibers 90 therethrough,S such that the optical fibers 90 are held in the water-proof rubber block 60, so as to be watertight. In assembly, the water-proof rubber block 60 is retained in the third chamber 15 of the housing 10 and the fourth chamber 562 of the strain relief housing 56, and is stopped by the first and second shoulders 151, 566. When the lock ring 58 is threadinly rotated around the metallic housing 10, it squeezes the water-proof rubber block 60 tightly into the metallic housing 10. This ensures a water-proof connection between the metallic housing 10 and the strain relief housing 56.

To assemble the multi-fiber array assembly, an end of a jacket of each optical fiber 90 is stripped, to expose a bare optical fiber. The stripped end has a length of about 50 mm. The bare optical fiber is extended through a corresponding spring 70 and then into a corresponding ferrule 80. A portion of the bare optical fiber 90 that protrudes beyond a front end of the ferrule 70 is cleaved. A front end of the bare optical fiber is polished for attaining required optical characteristics. An un-striped portion of the fiber 90 is extended through a corresponding hole 61 of the water-proof rubber block 60. The water-proof rubber block 60 is then retained in the third and fourth chambers 15, 562. The lock ring 58 is rotated to secure the metallic housing 10 and the strain relief housing 56 together. The ferrules 80 are inserted into the first array of holes 242. The stopper 30 is secured in the grooves 222, such that the compression springs 70 are located between the bottoms 84 of the ferrules 80 and the stopper 30. The front plate 40 is secured to the holder 20 such that the conical ends of the ferrules 80 are fitted into the conical sections 42 of the second array of holes 41. The springs 70 are compressed between the stopper 30 and the bottoms 84 of the ferrules 80 to exert a pushing force on the ferrules 80. The exposed ends of the optical fibers 90 behind the ferrules 80 are put into the passages 341, respectively. Finally, the front plate 40, the holder 20 and the stopper 30 are attached to the metallic housing 10. The holder 20 and the stopper 30 are received in the first chamber 11, and the front plate 40 is attached to the end face 162 of the metallic housing 10. Two screws (not shown) are screwed into the holes 164 to tightly engage with the holder 20, thereby firmly securing the holder 20 and the stopper 30 in the first chamber 11.

The multi-fiber array assembly of the present invention does not require the bonding material for assembly. The multi-fiber array assembly can therefore be easily disassembled to repair or replace any optical fiber that is found to be damaged or malfunctioning.

Although the present invention has been described with reference to a specific embodiment, it should be noted that the described embodiment is not necessarily exclusive and that various changes and modifications may be made to the described embodiment without departing from the scope of the invention as defined by the appended claims.

What is claimed is:

1. A multi-fiber array assembly comprising:
   a main housing;
   a stopper defining a plurality of passages;
   a ferrule holder retained in the main housing, and comprising, the stopper being secured to the ferrule holder at a location rearward of the first array of holes;
   a plurality of ferrules with optical fibers retained therein, each ferrule having a conical front end and being extended in a corresponding hole of the first array of holes;
   a plurality of pushing devices compressed between the ferrules and the stopper thereby exerting forward pushing force to the ferrules, the optical fibers extending through the passages of the stopper; and
   a front plate secured to a front of the ferrule holder and defining a second array of holes therein, each of the second array of holes having a rear conical section in which the conical front end of a corresponding ferrule is fitted.

2. The multi-fiber array assembly in accordance with claim 1, wherein each of the side plates comprises an end face, the ferrule holding plate is located behind the end faces, and the front plate is secured to the end faces.

3. The multi-fiber array assembly in accordance with claim 2, wherein two vertical grooves are respectively defined in inner faces of rear portions of the side plates, for retainingly receiving the stopper.

4. The multi-fiber array assembly in accordance with claim 1, further comprising:
   a strain relief housing secured to a rear end of the main housing;
   a water-proof rubber block mounted between the main housing and the strain relief housing, the water-proof rubber block defining a third array of holes corresponding to the first and second arrays of holes, the optical fibers extending through the third array of holes, respectively; and
   a strain relief boot secured to a rear end of the strain relief housing.

5. The multi-fiber array assembly in accordance with claim 4, wherein the main housing defines a first shoulder in the rear end thereof, the strain relief housing defines a second shoulder in a front end thereof, and the water-proof rubber block is compressed between the first and second shoulders.

6. The multi-fiber array assembly in accordance with claim 5, further comprising a turning lock ring having an inner thread and a projection, wherein the housing forms an outer thread at the rear end thereof, and the strain relief housing defines an annular recess in the front end thereof, the inner thread of the turning lock ring engaging with the outer thread of the housing and the projection fitting into the recess of the strain relief housing to thereby connect the main housing and the strain relief housing together and compress the rubber between the first and second shoulders.

7. A multi-fiber array assembly comprising:
   a main housing;
   a ferrule holder assembled with the main housing, and having a generally "H" shaped configuration with two opposite sidewalls, and a ferrule holding plate extending between the two sidewalls and defining a first array of holes extending therethrough in a direction;
   a front plate positioned in front of said ferrule holder with a second array of holes in alignment with the corresponding first array of holes in said direction; and
   a plurality of ferrules retained in the first array of holes, respectively, each with a conical front end inserted through a corresponding one of the second array of holes, respectively, and with a rear end urged to move forwardly by an individual spring; wherein
      each of said ferrules has therewithin an optic fiber which enters from the rear end and terminates at the conical front end.

8. The multi-fiber array assembly in accordance with claim 7, wherein the multi-fiber array assembly comprises a stopper defining a plurality of passages.

9. The multi-fiber array assembly in accordance with claim 8, wherein each sidewall of the ferrule holder defines a groove, and the stopper is fitted into the groove.

10. The multi-fiber array assembly in accordance with claim 9, wherein said spring abuts against the stopper positioned behind said ferrule holder.

11. The multi-fiber array assembly in accordance with claim 10, wherein said optic fiber extends through said stopper.

12. A multi-fiber array assembly comprising:
   a main housing;
   a stopper defining a plurality of passages;
   a ferrule holder retained in the main housing, and comprising a ferrule holding plate defining a first array of holes therethrough, the stopper being sectored to the ferrule bolder at a location rearward of the first array of holes;
   a plurality of ferrules each retaining a corresponding optical fiber therewithin, each ferrule having a conical front end and extending through a corresponding hole of the first away of holes;
   means for exerting a forward pushing force against the ferrules, the optical fibers extending through the passages of the stopper; and a front plate secured to a front of the ferrule holder and defining a second array of holes therein, each of the second array of holes defining a conical section in which the conical front end of a corresponding ferrule is fitted; wherein the ferrule holder has two side plates, each of the side plates comprises an end face, the ferrule holding plate extends between the two side plates and is located behind the end faces, and the front plate is secured to the end faces.

13. The multi-fiber array assembly in accordance with claim 12, wherein said means comprises spring coils compressed between the ferrules and the stopper.

14. The multi-fiber array assembly in accordance with claim 12, wherein the multi-fiber array assembly comprises a strain relief housing assembled with the main housing, and a rubber block is retained both in the main housing and the strain relief housing.

* * * * *